United States Patent [19]

Riple, Jr.

[11] 4,208,871
[45] Jun. 24, 1980

[54] FUEL CONTROL SYSTEM

[75] Inventor: James C. Riple, Jr., Rancho Palos Verdes, Calif.

[73] Assignee: The Garrett Corporation, Los Angeles, Calif.

[21] Appl. No.: 828,716

[22] Filed: Aug. 29, 1977

[51] Int. Cl.² ............................ F02C 9/10; F04B 49/08
[52] U.S. Cl. ................................ 60/39.28 R; 417/1; 417/18; 417/53; 417/252
[58] Field of Search ........................... 417/1, 2, 18–23, 417/53, 26–29, 252, 253; 60/39.28 R

[56] References Cited

U.S. PATENT DOCUMENTS

| 2,643,613 | 6/1953  | Westbury ........................ 417/206 |
| 2,653,543 | 9/1953  | Mott ............................... 417/206 |
| 3,056,259 | 10/1962 | Jubb et al. ..................... 60/39.28 |
| 3,233,651 | 2/1966  | Smith ............................ 417/253 |
| 3,584,977 | 6/1971  | Coleman et al. ................ 417/19 |
| 3,713,290 | 1/1973  | Gold .............................. 60/39.28 |
| 3,908,360 | 9/1975  | Meyer ........................... 60/39.28 |
| 3,932,058 | 1/1976  | Harner .......................... 60/39.28 |
| 3,935,851 | 2/1976  | Wright et al. ................. 60/39.28 |
| 3,946,551 | 3/1976  | Linebrink ...................... 417/203 |

FOREIGN PATENT DOCUMENTS 182154  6/1922  United Kingdom ..................... 417/252

Primary Examiner—William L. Freeh
Attorney, Agent, or Firm—Albert J. Miller; Joel D. Talcott; Stuart O. Lowry

[57] ABSTRACT

A fuel control system has a boost pump for pumping liquid fuel to a positive displacement pump, which in turn meters the fuel to a fuel nozzle of a combustion engine. The positive displacement pump is variably driven independently of the boost pump, and includes a pressure regulator for minimizing pressure difference across the pump.

20 Claims, 2 Drawing Figures

FUEL CONTROL SYSTEM

BACKGROUND OF THE INVENTION

This invention relates to fuel control systems for controllably supplying fuel to a combustion engine. More specifically, this invention relates to a fuel system control wherein fuel is accurately and electronically metered to an engine independent of pumping functions.

A wide variety of fuel supply systems are known throughout the prior art. Typically, fuel supply systems of the prior art comprise a pumping device which is driven or controlled by the engine to supply fuel from a fuel tank to a fuel nozzle, such as a spray nozzle for spraying fuel into the combustion chamber of a gas turbine engine. Importantly, the fuel supply system includes some type of flow control device for quantitatively adjusting the fuel delivery in accordance with engine fuel requirements. In many systems, positive displacement pumps have been used for supplying liquid fuel to an engine since such pumps are usable to perform both the pumping and metering functions. See, for example, U.S. Pat. Nos. 2,779,291 and 3,610,782. However, positive displacement pumps experience substantial and variable fluid pressure drop which gives rise to inefficiencies in operation. For example, as pressure differential across the pump increases, pumping efficiency and metering accuracy decreases. Accordingly, positive displacement pumps serving both to pump and meter fuel have not provided the wide range fuel flow metering accuracy required in many internal combustion engines.

Some prior art fuel control systems have been proposed including separate pumping and metering devices. See, for example, U.S. Pat. No. 3,056,259. Such systems typically include one or more pumps, and a separate meter or throttling device to control fluid flow. These arrangements have nor been totally satisfactory, however, since substantial variations in pressure difference across the metering device have still been found to occur, and such variations contribute to inaccuracies of the flow system. Other prior art fuel control systems have been proposed including separated pumping and metering devices together with secondary pumps and fuel feedback controls. See, for example, U.S. Pat. No. 3,233,651. Such systems do not, however, eliminate pressure variations across the metering device, and thereby do not accurately control the metered flow over a wide flow range. Still other prior art fluid flow systems have proposed separate pumps and meters driven from a common power source, with the pressure drop across the metering device being controlled by a pressure regulation device. See, for example, U.S. Pat. No. 3,515,164. However, systems of this type are designed for applications requiring constant fluid flow, and are not well adapted for use with combustion engines requiring accurately metered fuel flows over a relatively broad operating range. Moreover, in requiring a common power source for both metering and pumping functions, these devices do not lend themselves for use with modern, highly accurate, and energy-efficient electronic control systems.

This invention overcomes the problems and disadvantages of the prior art by providing a fuel control system having independently operated pumping and metering devices, and wherein the metering device is variably and electronically controlled for fuel delivery over a wide flow range independent of system pressure changes.

SUMMARY OF THE INVENTION

In accordance with the invention, a fuel control system for a combustion engine has a boost pump coupled to a fuel supply tank. The boost pump is driven by a suitable power source to provide fuel flow at a relatively high pressure and substantially uniform flow rate. The boost pump supplies the fuel to a positive displacement metering pump which is controllably driven independently of the boost pump by a variable speed electric motor. The electric motor in turn is variably controlled by an electronic control module responsive to engine operating conditions to control the fuel flow rate through the positive displacement metering pump in accordance with engine fuel demand.

A pressure regulator is connected across the positive displacement metering pump to maintain pressure difference across the metering pump at a relatively low, substantially constant level. When the pressure difference across the metering pump exceeds the predetermined level, the regulator functions to bypass a portion of the fuel through the pressure regulator and back to the fuel supply tank. Thus, the positive displacement metering pump meters the fuel to an engine fuel nozzle or the like at a variable flow rate independent of system pressure variations.

BRIEF DESCRIPTION OF THE DRAWINGS

The accompanying drawings illustrate the invention. In such drawings.

DETAILED DESCRIPTION OF THE PREFERRED EMBODIMENT

Figure 1:
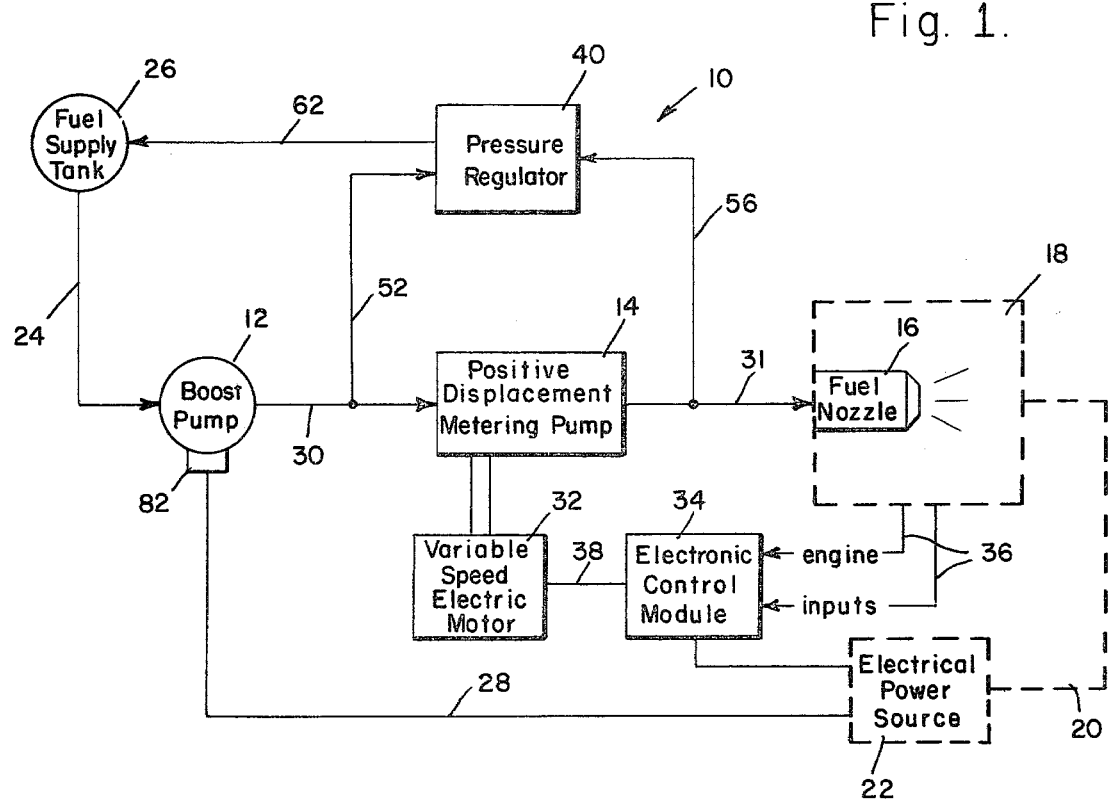
FIG. 1 is a schematic diagram illustrating a fuel control system of this invention.

A fuel control system 10 of this invention is shown schematically in FIG. 1, and generally comprises a boost pump 12 and a positive displacement metering pump 14 for supplying fuel to a fuel nozzle 16 or other fuel input device of a combustion engine 18. The engine 18 comprises any wide variety of combustion engines such as gas turbines, reciprocating engines, ram jet engines, etc., wherein fuel is supplied to a suitable combustion chamber for admixture with air or other oxidizers and for ignition. In operation, the engine 18 is adapted to perform useful work, and includes auxiliary power outputs illustrated by the line 20 for powering engine control equipment such as an electrical power source 22.

The boost pump 12 is generally conventional in construction, and is coupled by a suitable conduit 24 to a supply tank 26 containing ignitable fuel for the engine 18. Importantly, the boost pump 12 is driven by raw vehicle power, such as by the electrical power source 22 via a conductive lead 28. In this manner, the boost pump 12 serves to pump fuel from the supply tank 26 at a generally uniform and relatively high pressure level. That is, in practice, the boost pump 12 is driven by the engine 18 to pump fuel at a flow rate and pressure level equalling or exceeding that required by the engine for continued operation under maximum flow rate and pressure demand conditions. Alternately, if desired, the boost pump 12 may be driven directly by the engine, as by suitable gearing, provided the pump 12 is sized to continuously pump fuel at a flow rate and pressure sufficient to meet engine demand.

The boost pump 12 supplies the fuel through a conduit 30 to the positive displacement metering pump 14. The metering pump 14 is also generally conventional in construction, and may comprise a suitable gear pump, vane pump, or other positive displacement pump elements operable to discharge positive increments of fuel through a conduit 31 to fuel nozzle 16. The metering pump 14 is rotatably driven independently of the boost pump at a controlled speed by a variable speed electric motor 32, which in turn is electrically operated and controlled by an electronic control module 34. The control module 34 is coupled to the engine 18 by appropriate leads 36 for receiving inputs from the engine proportional to engine fuel flow and pressure requirements. For example, the leads 36 may provide the module 34 with electronic information corresponding to engine speed, temperature, pressure, load, or other appropriate operating parameters. The module 34 is constructed to respond to these input signals, and to provide a controlling output on line 38 for closely controlling the speed of the electric motor 32. Importantly, the design of the module 34 differs for each size and type of engine 18, and it is within the skill of the art to design and construct a module customized for a given engine and set of parameters. Accordingly, the specific circuitry of the module 34 is not shown or described in detail.

Figure 2:
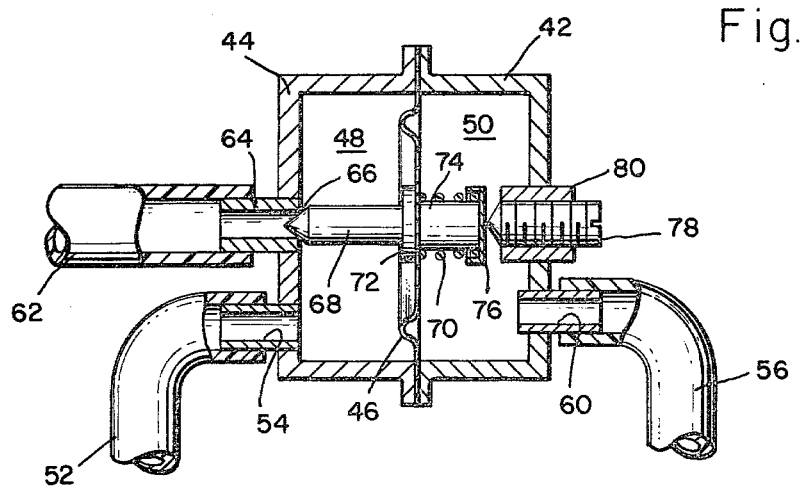
FIG. 2 is an enlarged fragmented elevation view of a pressure regulator for use with the fuel control system of FIG. 1.

A pressure regulator 40 is coupled across the metering pump 14 to closely control the pressure difference across the pump 14. More specifically, as shown in FIGS. 1 and 2, the pressure regulator 40 comprises a canister-shaped housing formed from facing halves 42 and 44. The housing includes a flexible internal diaphragm 46 dividing the regulator 40 into two isolated chambers 48 and 50, respectively. A first conduit 52 is connected between the conduit 30 and the chamber 48 by a fitting 54, and a second conduit 56 is connected between the conduit 31 and the second chamber 50 by a fitting 60. In this manner, the diaphragm 46 is subjected to the pressure difference between the inlet and outlet pressures of the positive displacement metering pump 14, with the pump inlet pressure acting against the lefthand side of the diaphragm 46 and the pump oulet pressure acting against the righthand side of the diaphragm as viewed in FIG. 2. Typically, the positive displacement metering pump 14 will experience a pressure drop during operation, whereby the net force on the diaphragm will urge the diaphragm toward the right as viewed in the drawing.

An additional conduit 62 is connected between the chamber 48 of the regulator 40 by a fitting 64, and the fuel supply tank 26. The fitting 64 has a valve seat 66 formed on its end within the chamber 48, and a valve stem 68 is provided for seating on the valve seat 66. The valve stem 68 is connected to the diaphragm 46 by a screw 74 and washer 72, and projects through the chamber 48 for seating upon the valve seat 66. A compression spring 70 is carried between the head of the screw 74 and a pressure plate 76 within the other chamber 50 for controlling the position of the valve stem 68 with respect to the valve seat 66. A set screw 78 is threadably carried in the canister wall 42 in a threaded sleeve 80, and bears against the pressure plate 76 to bias the valve stem 68 toward a seated position to normally close the conduit 62 against passage of fluid.

The set screw 78 is adjustable to control the position of the valve stem 68 in response to pressure differential acting upon the diaphragm 46. That is, the spring 70 urges the diaphragm 46 and the valve stem 68 toward the left as viewed in FIG. 2 against the effects of the net metering pump 14 inlet and outlet pressures acting upon the diaphragm. In practice, the set screw 78 is adjusted so that the forces on the diaphragm resulting from the spring 70 are relatively low, say about five pounds per square inch, or less. In this manner, during operation of the metering pump 14, the pressure drop across the metering pump 14 is maintained at a relatively low and substantially constant level. Whenever the pressure drop across the pump 14 momentarily exceeds a maximum pressure level governed by the adjustment of the set screw 78, the valve stem 68 retracts from the valve seat 66 to allow a portion of the fuel delivered by the boost pump 12 to bypass the metering pump 14 via the conduits 52 and 62 to return to the fuel supply tank 26. Accordingly, excess fuel flow is relieved back to the fuel supply tank 26 to reduce the pressure drop across the metering pump 14.

The pressure regulator 40 serves to maintain pressure drop across the metering pump 14 at a relatively low level in order to allow the pump 14 to meter fuel substantially independently of system pressure and fuel viscosity variations. Importantly, the metering pump 14 sees the same low pressure difference at all times, regardless of engine fuel quantity and pressure demand and regardless of the operation of the boost pump. That is, when the engine requires low fuel volumes at relatively low pressures, the variable speed motor 32 drives the pump 14 at a relatively slow speed, and a substantial portion of the fuel supplied by the boost pump 12 is bypassed to the fuel supply tank 26. At higher fuel demand and pressure conditions, the motor speed 32 is increased, and a lesser portion of the boost pump fuel is bypassed to maintain the metering pump pressure drop at a substantially constant level.

A wide variety of modifications of the fuel control system of this invention are possible within the scope of this invention. For example, if desired, fuel may be bypassed directly to the boost pump 12 instead of to the fuel supply tank 26. Moreover, in some applications, rough control of the volumetric flow rate of the boost pump 12 may be provided. That is, for example, the boost pump 12 may be step-controlled for operation at two or more speeds as by a speed control switch 82 for reducing fuel flow rate during prolonged low fuel demand periods to prevent excessive overheating of large amounts of fuel bypassing the metering pump. Of course, at each speed level, the boost pump 12 is operated to supply fuel at a flow rate and pressure sufficient to meet or exceed demand. Still further, the metering pump 14 may be designed to increase the pressure of the metered fuel by a relatively low substantially constant level, whereupon the pressure regulation would be designed to operate accordingly. And, if desired, the system may be used for pumping and metering any of a variety of liquids wherein accurate metered delivery is required.

What is claimed is:

1. A fuel control system for controllably supplying fuel from a fuel supply to a combustion engine, comprising first pump means for pumping liquid fuel from the supply at a pressure level at least equaling engine requirements; second pump means for metering the liquid pumped by said first pump means, said second pump means being for supplying the metered fuel directly to the engine; means for variably driving said second pump means at a speed responsive to engine fuel requirements and generally independent of said first pump means; and pressure control means connected across said second pump means for limiting the pressure difference across said second pump means to a relatively low, substantially constant level, said pressure control means including means for bypassing from said second pump means a portion of the liquid pumped by said first pump means.

2. A system as set forth in claim 1 wherein said first pump means comprises a boost pump for pumping liquid at a relatively high flow rate and pressure.

3. A system as set forth in claim 1 wherein said second pump means comprises a positive displacement metering pump.

4. A fuel control system as set forth in claim 1 wherein said driving means comprises a variable speed electric motor coupled to said second pump means, and including an electronic control module for controlling the driving speed of said motor.

5. A fuel control system as set forth in claim 1 wherein said pressure control means comprises a pressure regulator coupled across said second pump means, and responsive to changes in pressure difference across said second pump means for directing a portion of the liquid pumped by said first pump means back to said first pump means to controllably reduce the pressure of liquid passing through said second pump means.

6. A system as set forth in claim 1 wherein said driving means cmprises a variable speed electric motor coupled to said second pump means, and including control means for controlling the driving speed of said motor.

7. A system as set forth in claim 6 wherein said control means comprises an electronic control module.

8. A fuel control system for controllably supplying fuel from a fuel supply to a combustion engine, comprising a boost pump for pumping fuel from the fuel supply at a pressure at least equaling engine requirements; a positive displacement metering pump coupled between said boost pump and the engine for supplying fuel from said metering pump directly to the engine; a variable speed electric motor for controllably driving said metering pump; control means for variably controlling the driving rate of said motor in response to engine fuel requirements and generally independent of the speed of said boost pump; and pressure control means coupled across said metering pump for limiting the pressure difference across said metering pump to a relatively low, substantially constant level, said pressure control means including a pressure regulator including means responsive to pressure difference across said metering pump for directing a portion of the fuel pumped by said boost pump back to the fuel supply to controllably reduce the pressure of fuel passing through said metering pump.

9. A fuel control system as set forth in claim 8 wherein said control means comprises an electronic control module responsive to predetermined engine operating parameters.

10. A fuel control system for controllably supplying fuel from a fuel supply to a combustion engine, comprising a boost pump for pumping fuel from the fuel supply; first driving means for driving the boost pump at a rate of speed sufficient to pump fuel to meet engine fuel and pressure requirements; a metering pump for metering fuel from the boost pump to the engine; second driving means for variably driving said metering pump, and including control means responsive to predetermined engine operating parameters; and pressure control means coupled across said metering pump for limiting the pressure difference across said metering pump to a relatively low, substantially constant level, said pressure control means including means for bypassing from said metering pump a portion of the fuel pumped by said boost pump, and for coupling the bypassed portion to the fuel supply.

11. A fuel control system as set forth in claim 10 wherein said control means comprises an electronic control module.

12. In a fuel control system for a cmbustion engine including a boost pump for pumping fuel from a fuel supply at a flow rate and pressure sufficient to meet engine requirements under maximum operating conditions, a fuel metering system comprising a positive displacement metering pump coupled between the boost pump and the engine; a variable speed electric motor for driving said metering pump; control means responsive to predetermined engine operating parameters for controllably varying the driving speed of said motor independent of the speed of said boost pump; and pressure control means for limiting the pressure difference across said metering pump to a predetermined, relatively low pressure, said pressure control means including means for bypassing said metering pump and for coupling to the fuel supply a portion of the fuel pumped by said boost pump.

13. A method of controlling the supply of fuel from a fuel supply to an engine comprising the steps of pumping the fuel from the fuel supply at a pressure level at least equaling engine requirements; metering the pumped fuel directly to the engine with metering means; controlling said metering means in accordance with engine fuel requirements and independent of said pumping step; and limiting the pressure difference across said metering means to a relatively low, substantially constant level, said limiting step including bypassing from the metering means a portion of the pumped fuel to control the pressure difference across said metering means.

14. The method of claim 13 wherein said pumping step comprises pumping the fuel with a boost pump driven by the engine at a rate of speed to supply fuel at a flow rate and pressure sufficient to meet maximum engine requirements.

15. The method of claim 13 wherein said metering step comprises metering the fuel with a positive displacement metering pump.

16. The method of claim 13 wherein said controlling step comprises variably driving the metering with a variable speed electric motor, and controlling the speed of said motor in response to predetermined engine operating conditions.

17. The method of claim 16 wherein said controlling step includes sensing the predetermined engine operating conditions and variably controlling said motor with electronic control means.

18. A method of controlling the supply of fuel from a fuel supply to an engine comprising the steps of pumping the fuel from the fuel supply with a boost pump at a flow rate and pressure to meet maximum engine operating conditions; metering the fuel to the engine with a positve displacement metering pump varibly driven independent of the boost pump by a variable speed electric motor; controlling the driving speed of said motor with control means responsive to predetermined engine operating parameters; and limiting with pressure control means the pressure difference across the metering pump to a relatively low pressure, said limiting step including directing a portion of the fuel pumped by said boost pump back to the fuel supply to control the pressure of fuel passing through said metering pump.

19. The method of claim 18 wherein said controlling step comprises controlling the driving speed of said motor with electronic control means responsive to predetermined engine operating parameters.

20. A fuel control system for controllably supplying fuel from a fuel supply to a combustion engine, comprising first pump means for pumping liquid from the supply at a pressure level at least equaling engine requirements; second pump means for metering the liquid pumped by said first pump means, said second pump means being for supplying the metered fuel directly to the engine; means for variably driving said second pump means at a speed responsive to engine fuel requirements and generally independent of said first pump means; and pressure control means connected across said second pump means for limiting the pressure difference across said second pump means to a relatively low, substantially constant level, said pressure control means comprising a pressure regulator coupled across said second pump means, and responsive to changes in pressure difference across said second pump means for directing a portion of the liquid pumped by said first pump means back to said first pump means to controllably reduce the pressure of fluid passing through said second pump means.

* * * * *